(12) United States Patent
Kobayashi et al.

(10) Patent No.: US 10,286,392 B2
(45) Date of Patent: May 14, 2019

(54) EXHAUST GAS PURIFICATION CATALYST

(71) Applicants: CATALER CORPORATION, Kakegawa-shi, Shizuoka-ken (JP); TOYOTA JIDOSHA KABUSHIKI KAISHA, Toyota-shi, Aichi-ken (JP)

(72) Inventors: Shintaro Kobayashi, Kakegawa (JP); Makoto Tsuji, Kakegawa (JP); Hiroto Imai, Kakegawa (JP); Takeshi Hirabayashi, Toyota (JP)

(73) Assignees: CATALER CORPORATION, Kakegawa (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/051,671

(22) Filed: Aug. 1, 2018

(65) Prior Publication Data
US 2019/0099749 A1  Apr. 4, 2019

(30) Foreign Application Priority Data
Sep. 29, 2017 (JP) ................. 2017-191997

(51) Int. Cl.
*B01J 35/10* (2006.01)
*B01D 53/94* (2006.01)
(Continued)

(52) U.S. Cl.
CPC ........ *B01J 35/108* (2013.01); *B01D 53/9418* (2013.01); *B01J 29/044* (2013.01); *B01J 29/06* (2013.01); *B01J 29/85* (2013.01); *B01J 35/04* (2013.01); *B01J 35/1076* (2013.01); *B01J 37/0215* (2013.01); *F01N 3/0293* (2013.01); *F01N 3/035* (2013.01); *B01D 2255/20723* (2013.01); *B01D 2255/20738* (2013.01); *B01D 2255/20761* (2013.01); *B01D 2255/50* (2013.01); *B01D 2255/9155* (2013.01); *B01D 2255/9205* (2013.01); *F01N 2250/02* (2013.01); *F01N 2510/063* (2013.01); *F01N 2610/02* (2013.01)

(58) Field of Classification Search
None
See application file for complete search history.

(56) References Cited

U.S. PATENT DOCUMENTS

2008/0241013 A1* 10/2008 Ohno ................. B01D 46/2429
422/180
2009/0087365 A1   4/2009 Klingmann et al.

FOREIGN PATENT DOCUMENTS

| JP | 2009-082915 A | 4/2009 |
| JP | 2012-514157 A | 6/2012 |
| WO | 2010/075345 A2 | 7/2010 |

* cited by examiner

*Primary Examiner* — Walter D. Griffin
*Assistant Examiner* — Jelitza M Perez
(74) *Attorney, Agent, or Firm* — Oliff PLC

(57) ABSTRACT

The present invention provides an exhaust gas purification catalyst provided with: a substrate of wall flow structure in which inlet cells and outlet cells are partitioned by porous partition walls; and a catalyst layer disposed at least inside the partition wall and including a catalyst body. The catalyst layer satisfies the following conditions: (1) the pore volume of pores no larger than 5 μm, as measured in accordance with a mercury intrusion technique, is 24000 mm$^3$ or greater per L of volume of the substrate; and (2) a permeability coefficient measured by a Perm porometer is 0.6 μm$^2$ to 4.4 μm$^2$.

10 Claims, 4 Drawing Sheets

(51) Int. Cl.
*B01J 29/06* (2006.01)
*B01J 29/04* (2006.01)
*B01J 35/04* (2006.01)
*B01J 37/02* (2006.01)
*F01N 3/035* (2006.01)
*F01N 3/029* (2006.01)
*B01J 29/85* (2006.01)

EXHAUST GAS PURIFICATION CATALYST

CROSS REFERENCE TO RELATED APPLICATIONS

The present application claims priority based on Japanese Patent Application No. 2017-191997, filed on Sep. 29, 2017, the entire contents of which are incorporated herein by reference.

BACKGROUND OF THE DISCLOSURE

1. Field

The present invention relates to an exhaust gas purification catalyst. More particularly, the present invention relates to an exhaust gas purification catalyst that is disposed in an exhaust path of an internal combustion engine, and purifies exhaust gas emitted by the internal combustion engine.

2. Background

Exhaust gas emitted by internal combustion engines, such as automotive engines, contains harmful components such as nitrogen oxides ($NO_x$), hydrocarbons (HC), and carbon monoxide (CO), as well as particulate matter (PM). Exhaust gas purification catalysts are conventionally used in order to efficiently trap and remove such harmful components and PM from exhaust gas.

Prior art literature relevant herein includes for instance Japanese Patent Application Publication No. 2012-514157. This publication discloses a selective catalytic reduction (SCR) catalyst that is effective for $NO_x$ purification, and an exhaust gas purification device that is provided with this SCR catalyst. The disclosed exhaust gas purification device is provided with an exhaust gas purification catalyst, and with a reducing agent supply section provided upstream of the exhaust gas purification catalyst, in the exhaust gas flow direction. The exhaust gas purification catalyst has a catalyst layer containing an SCR catalyst body. When a reducing agent (for instance aqueous urea) is supplied to the exhaust gas upstream of the exhaust gas purification catalyst, the reducing agent becomes hydrolyzed into ammonia. The generated ammonia becomes adsorbed onto the catalyst body. The $NO_x$ in the exhaust gas is converted into nitrogen and water as a result of the reducing action of the ammonia adsorbed on the catalyst body, and the $NO_x$ in the exhaust gas becomes purified as a result.

SUMMARY

Recent years have witnessed a trend towards increasingly stricter exhaust gas regulations and more demanding fuel efficiency regulations. For instance, the upper limit of the $NO_x$ emission standard for diesel vehicles in "Euro 6", issued in Europe on September 2014, has been significantly lowered. It is accordingly desirable to further enhance the exhaust gas purification performance, in particular $NO_x$ purification performance, of exhaust gas purification catalysts.

In view of the above it is an object of the present invention to provide an exhaust gas purification catalyst in which exhaust gas purification performance is enhanced.

The present invention provides an exhaust gas purification catalyst disposed in an exhaust path of an internal combustion engine, and being configured to purify exhaust gas emitted by the internal combustion engine. The exhaust gas purification catalyst is provided with: a substrate of wall flow structure where an inlet cell in which an exhaust gas inflow end section is open and an exhaust gas outflow end section is closed, and an outlet cell in which an exhaust gas outflow end section is open and an exhaust gas inflow end section is closed, are partitioned by a porous partition wall; and a catalyst layer disposed at least inside the partition wall and including a catalyst body. The catalyst layer satisfies the following conditions: (1) in a relationship between a pore size and a pore volume based on a pore distribution measured in accordance with a mercury intrusion technique, the pore volume of pores no larger than 5 µm is 24000 $mm^3$ or greater per L of volume of the substrate; and (2) a permeability coefficient measured by a Perm porometer is 0.6 $µm^2$ to 4.4 $µm^2$.

Satisfying both conditions (1) and (2) allows securing exhaust gas permeability, and increasing the contact ability between the exhaust gas and the catalyst body. Further, diffusion and convection of the exhaust gas inside the catalyst layer is facilitated and it becomes possible to suppress slip-through of the exhaust gas. Therefore, reactivity between the exhaust gas and the catalyst body can be made relatively higher, and purification performance on harmful components better, than those of when one or more of conditions (1) and (2) above is not satisfied.

In a preferred aspect, the permeability coefficient is 1.9 $µm^2$ or larger. As a result it becomes possible to better increase purification performance on harmful components, for instance $NO_x$ purification performance.

In a preferred aspect, the permeability coefficient is 2.4 $µm^2$ or smaller. As a result it becomes possible to better increase purification performance on harmful components, for instance $NO_x$ purification performance.

In a preferred aspect, the pore volume of the pores no larger than 5 µm is 67000 $mm^3$ or greater per L of volume of the substrate. As a result it becomes possible to better increase purification performance on harmful components, for instance $NO_x$ purification performance.

In a preferred aspect, the pore volume of the pores no larger than 5 µm is 121000 $mm^3$ or smaller per L of volume of the substrate. As a result it becomes possible to better increase exhaust gas permeability, and to reduce pressure loss.

In a preferred aspect, the catalyst layer is disposed so as to be in contact with the outlet cell. As a result it becomes possible to suppress contact between the catalyst layer and PM, upon intrusion of PM into the partition wall. Exhaust gas permeability can therefore be secured more suitably.

In a preferred aspect, the catalyst layer covers a total length of the partition wall in an extension direction of the partition wall. As a result it becomes possible to accurately bring the exhaust gas and the catalyst layer into contact with each other, and prevent thereby slip-through of harmful components. Therefore, this allows better suppressing discharge of unpurified exhaust gas out of the exhaust gas purification catalyst.

In a preferred aspect, the catalyst body contains at least one of a zeolite, silicoaluminophosphate, aluminophosphate and an ion-exchanged zeolite. The effect of the technology disclosed herein can be better brought out as a result.

The present invention provides an exhaust gas purification device provided with: an internal combustion engine; an exhaust path for exhaust gas, the exhaust path having one end connected to the internal combustion engine; the above exhaust gas purification catalyst, disposed in the exhaust path for exhaust gas; and a reducing agent supply mechanism that supplies a reducing agent to the exhaust gas in the exhaust path for exhaust gas and upstream of the exhaust gas purification catalyst in the flow direction of exhaust gas. By virtue of the above configuration it becomes possible to relatively enhance purification performance on harmful components as compared with that of conventional exhaust gas purification devices.

In a preferred aspect, the internal combustion engine is a diesel engine. Harmful components such as $NO_x$ are present in exhaust gas emitted by a diesel engine in relatively greater amounts than in exhaust gas emitted for instance by gasoline engines, and accordingly the use of the technology disclosed herein is more effective in the case of diesel engines.

DETAILED DESCRIPTION OF THE PREFERRED EMBODIMENTS

Figure 1:
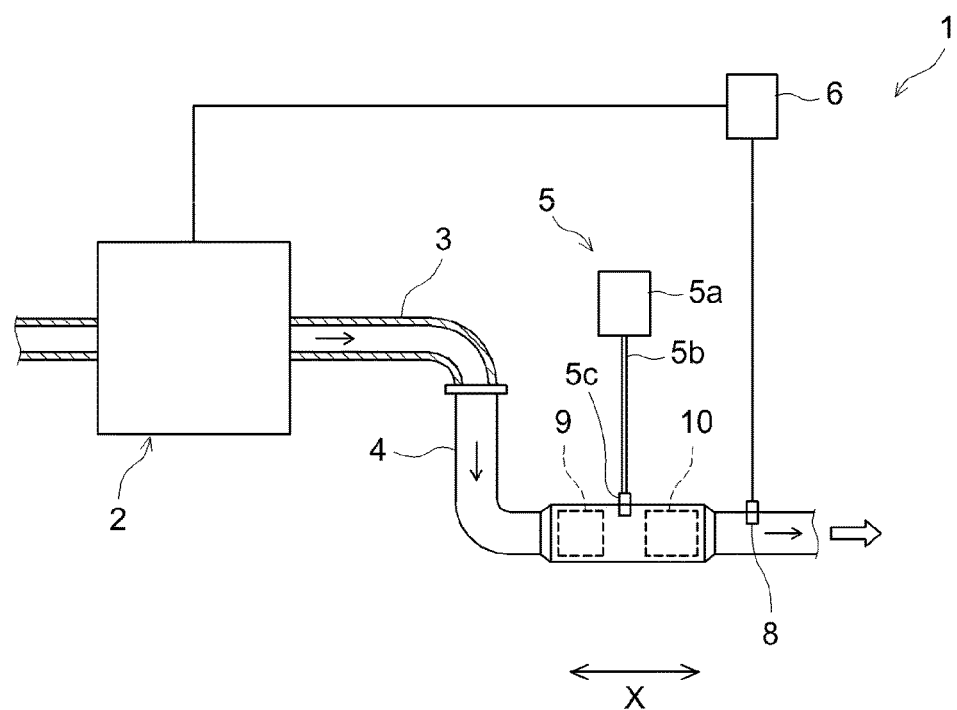
FIG. 1 is a schematic diagram illustrating an exhaust gas purification device according to an embodiment, and the structures surrounding the device.

Preferred embodiments will be explained below on the basis of drawings. The drawings below, members and portions that elicit identical effects are denoted with identical reference numerals, and a recurrent explanation thereof will be omitted or simplified. The dimensional relationships (length, width, thickness and so forth) in the figures do not necessarily reflect actual dimensional relationships. Any features other than the features specifically set forth in the present description and which may be necessary for carrying out the present invention can be regarded as instances of design matter, for a person skilled in the art, based on conventional techniques in the technical field in question. The technology disclosed herein can be realized on the basis of the disclosure of the present specification and common technical knowledge in the relevant technical field. In the present specification a numerical value range notated as "A to B" (where A and B are arbitrary numerical values) denotes a value equal to or larger than A and equal to or smaller than B.

FIG. 1 is a schematic diagram illustrating an exhaust gas purification device 1 according to an embodiment, and the structures surrounding the device. The arrows in the figure illustrate the flow direction of exhaust gas. The exhaust gas purification device 1 is provided in an exhaust system of an internal combustion engine (engine) 2. An air-fuel mixture containing oxygen and diesel fuel is supplied to the internal combustion engine 2. The air-fuel mixture is burned in the internal combustion engine 2, and the resulting combustion energy is converted to mechanical energy. The burned air-fuel mixture becomes thereupon exhaust gas that is discharged to the exhaust system. The internal combustion engine 2 of the present embodiment is configured as a main constituent of the diesel engine of an automobile. The internal combustion engine 2 may be an engine (for instance a gasoline engine) other than a diesel engine.

The exhaust gas purification device 1 has the function of purifying harmful components, for instance $NO_x$, HC, CO and the like, contained in the exhaust gas that is emitted by the internal combustion engine 2, and the function of trapping PM contained in the exhaust gas that is emitted by the internal combustion engine 2. The exhaust gas purification device 1 is provided with an exhaust path that communicates the internal combustion engine 2 and the exhaust system, a reducing agent supply mechanism 5, an engine control unit (ECU) 6, a first exhaust gas purification catalyst 9, and a second exhaust gas purification catalyst 10. The exhaust gas purification device 1 is a so-called urea-SCR system.

The exhaust path in the present embodiment is made up of an exhaust manifold 3 and an exhaust pipe 4. One end of the exhaust manifold 3 is connected to an exhaust port (not shown) that communicates with the exhaust system of the internal combustion engine 2. The other end of the exhaust manifold 3 is connected to the exhaust pipe 4. The first exhaust gas purification catalyst 9 and the second exhaust gas purification catalyst 10 are disposed halfway in the exhaust pipe 4.

The reducing agent supply mechanism 5 is provided with a reservoir 5a, a flow channel 5b and a discharge unit 5c. The reservoir 5a stores a reducing agent. The reducing agent is for instance ammonia, an ammonia precursor such as urea, or a hydrocarbon such as diesel fuel. The reducing agent is typically a liquid. The flow channel 5b communicates the reservoir 5a and the discharge unit 5c. The discharge unit 5c is provided upstream of the second exhaust gas purification catalyst 10, in the exhaust path. The discharge unit 5c injects the reducing agent. The reducing agent becomes mixed as a result with the exhaust gas. The exhaust gas having had the reducing agent mixed thereinto flows to the second exhaust gas purification catalyst 10 positioned downstream of the discharge unit 5c in the exhaust path.

In a case where diesel fuel identical to that used in the internal combustion engine 2 is utilized as the reducing agent, then that diesel fuel may be injected directly into the exhaust gas. Accordingly, the reducing agent supply mechanism 5 need not have the reservoir 5a that stores reducing agent. The flow channel 5b may be configured so as to communicate a diesel fuel tank with the discharge unit 5c.

The ECU 6 is electrically connected to the internal combustion engine 2 and the discharge unit 5c of the reducing agent supply mechanism 5. The ECU 6 is also electrically connected to sensors (for instance pressure sensor 8) that are disposed at various sites in the exhaust gas purification device 1 and the internal combustion engine 2. The configuration of the ECU 6 may be identical to conventional configurations, and is not particularly limited. The ECU 6 may be for instance a digital computer. An input port (not shown) and an output port (not shown) are provided in the ECU 6. Information detected by the sensors is transmitted to the ECU 6, in the form of electrical signals, via the input port. The ECU 6 transmits control signals via the output port. The ECU 6 controls the internal combustion engine 2 and the discharge unit 5c of the reducing agent supply mechanism 5. The ECU 6 controls for instance the discharge (for instance, discharge amount and discharge timing) of the reducing agent from the discharge unit 5c, for example in accordance with the amount of exhaust gas that is emitted by the internal combustion engine 2.

The configuration of the first exhaust gas purification catalyst 9 may be identical to conventional configurations, and is not particularly limited. The first exhaust gas purification catalyst 9 may be for instance one or two or more of (a) to (d) below:

(a) a diesel oxidation catalyst (DOC) that purifies HC and CO contained in the exhaust gas;

(b) a $NO_x$ adsorption reduction ($NO_x$ storage-reduction (NSR)) catalyst that stores $NO_x$ during normal operation (under lean conditions) and that purifies $NO_x$, using HC or CO as a reducing agent, during injection of a larger amount of fuel (under rich conditions);

(c) a three-way catalyst that purifies simultaneously $NO_x$, HC and CO contained in the exhaust gas; or (d) a diesel particulate filter (DPF) that removes PM contained in the exhaust gas.

The first exhaust gas purification catalyst 9 may contain for instance a carrier and a metal catalyst supported on the carrier, for example rhodium (Rh), palladium (Pd), platinum (Pt) or the like. The first exhaust gas purification catalyst 9 may contain for instance a metal catalyst and a $NO_x$-storing substance. The first exhaust gas purification catalyst 9 is not necessarily required, and can be omitted. A further third exhaust gas purification catalyst, for instance an oxidation catalyst (DOC) for ammonia slip, aimed at removal of residual ammonia in exhaust gas, can be disposed downstream of the second exhaust gas purification catalyst 10.

Figure 2:
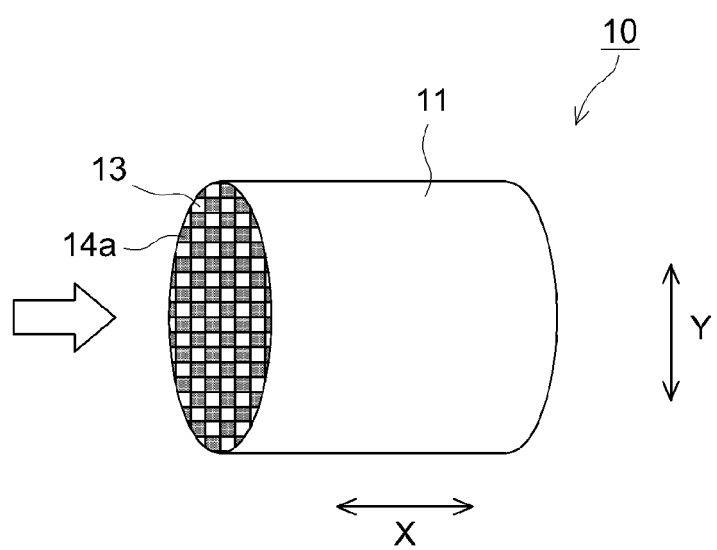
FIG. 2 is a perspective-view diagram illustrating schematically an exhaust gas purification catalyst according to an embodiment.
Figure 3:
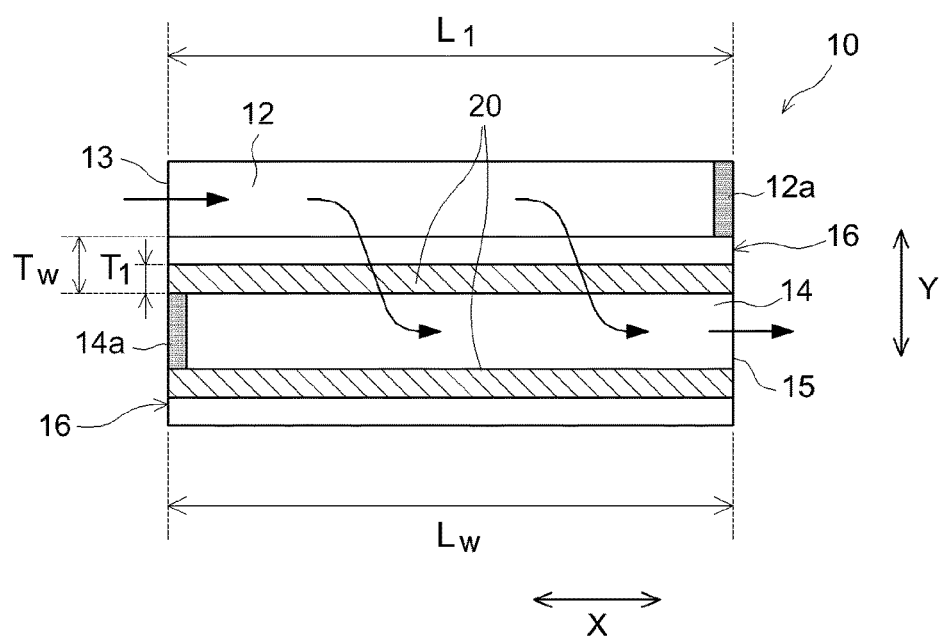
FIG. 3 is a partial cross-sectional diagram illustrating schematically an exhaust gas purification catalyst according to an embodiment.

FIG. 2 is a perspective-view diagram illustrating schematically the second exhaust gas purification catalyst 10. FIG. 3 is a partial cross-sectional diagram illustrating schematically part of a cross-section resulting from cutting the second exhaust gas purification catalyst 10 in a cylinder axial direction. The arrows in FIGS. 2 and 3 denote the flow direction of exhaust gas. Specifically, the left side in FIGS. 2 and 3 is the upstream side (front side) of the flow direction of the exhaust gas, relatively closer to the internal combustion engine 2, while the right side is the downstream side (rear side) in the flow direction of exhaust gas relatively farther from the internal combustion engine 2. The reference symbol X denotes the cylinder axial direction of the second exhaust gas purification catalyst 10, in other words, the extension direction of partition walls 16. The reference symbol Y denotes a direction perpendicular to that of the reference symbol X, i.e. a direction from the face of the partition walls 16 in contact with inlet cells 12 towards the face in contact with outlet cells 14; in other words, the reference symbol Y denotes the thickness direction of the partition walls 16. The foregoing are merely directions for convenience of explanation, and the arrangement form of the second exhaust gas purification catalyst 10 is not limited thereto in any way.

The second exhaust gas purification catalyst 10 has the function of purifying harmful components, for instance $NO_x$, HC, CO and the like contained in the exhaust gas. Preferably, the second exhaust gas purification catalyst 10 further has the function of trapping PM contained in the exhaust gas. In the present embodiment, the second exhaust gas purification catalyst 10 is an SCR catalyst. The second exhaust gas purification catalyst 10 is provided with a substrate 11 having a wall flow structure, and a catalyst layer 20 disposed on the partition walls 16 of the substrate 11.

The substrate 11 makes up the backbone of the second exhaust gas purification catalyst 10. The substrate 11 is a honeycomb structure. As the substrate 11, conventional substrates of various materials and forms that are used in this kind of applications can be used as appropriate. For instance, substrates made up of a high heat-resistant material, typified by ceramics such as cordierite, aluminum titanate, and silicon carbide (SiC), or out of an alloy such as stainless steel, can be used herein. The overall outer shape of the substrate 11 in the present embodiment is a cylindrical shape. However, the overall outer shape of the substrate 11 is not particularly limited, and an elliptic cylindrical shape or polygonal cylindrical shape may be adopted, instead of a cylindrical shape, as the outer shape of the substrate as a whole. The volume of the substrate 11 is not particularly limited, and is typically 1 L to 10 L, for instance 2 L to 5 L. The term "volume of the substrate 11" denotes the net volume of the substrate 11, without including void portions formed inside the substrate 11.

The substrate 11 has a plurality of inlet cells 12 each having an exhaust gas inflow end section 13 that is open, a plurality of outlet cells 14 each having an exhaust gas outflow end section 15 that is open, and a plurality of partition walls 16 that partition the inlet cells 12 and the outlet cells 14. The shape of the inlet cells 12 and of the outlet cells 14 is not particularly limited. For instance, the inlet cells 12 and the outlet cells 14 may adopt various geometrical shapes, such as a rectangular shape including squares, parallelograms, rectangles and trapezoids, and also triangular and other polygonal shapes (for instance, hexagons and octagons), as well as circular shapes. A sealing section 12a is disposed at the exhaust gas outflow end section of the inlet cells 12, such that the exhaust gas outflow end section is plugged by the sealing section 12a. A sealing section 14a is disposed at the exhaust gas inflow end section of the outlet cells 14, such that the exhaust gas inflow end section is plugged by the sealing section 14a.

The inlet cells 12 and the outlet cells 14 are partitioned by the partition walls 16. The partition walls 16 extend in the cylinder axial direction of the second exhaust gas purification catalyst 10 i.e. in the X direction. A total length $L_w$ of the partition walls 16 in the X direction is not particularly limited, but is typically 10 mm to 500 mm, for instance 50 mm to 300 mm. The length of the partition walls 16 in the Y direction, i.e. an average thickness $T_w$ of the partition walls 16, is not particularly limited, but may be about 1 mil to 30 mils (1 mil being about 25.4 µm), for instance 5 mils to 20 mils, from the viewpoint of increasing mechanical strength and reducing pressure loss.

The partition walls 16 have a porous structure that allows exhaust gas to pass therethrough. The exhaust gas flowing into the inlet cells 12 from the exhaust gas inflow end section 13 passes through the partition walls 16, and is discharged out of the second exhaust gas purification catalyst 10 from the exhaust gas outflow end section 15 of the outlet cells 14. The porosity (value based on a mercury intrusion technique; likewise hereafter) of the partition walls 16 is not particularly limited, but may be about 20 to 80 vol %, typically 50 to 75 vol %, and for instance 60 to 70 vol %, for example from the viewpoint of increasing mechanical strength and reducing pressure loss. The average pore size (value based on a mercury intrusion technique; likewise hereafter) of the partition walls 16 is not particularly limited, but may be about 10 µm to 40 µm, and for instance 15 µm to 25 µm, for example from the viewpoint of increasing mechanical strength and reducing pressure loss.

Figure 4:
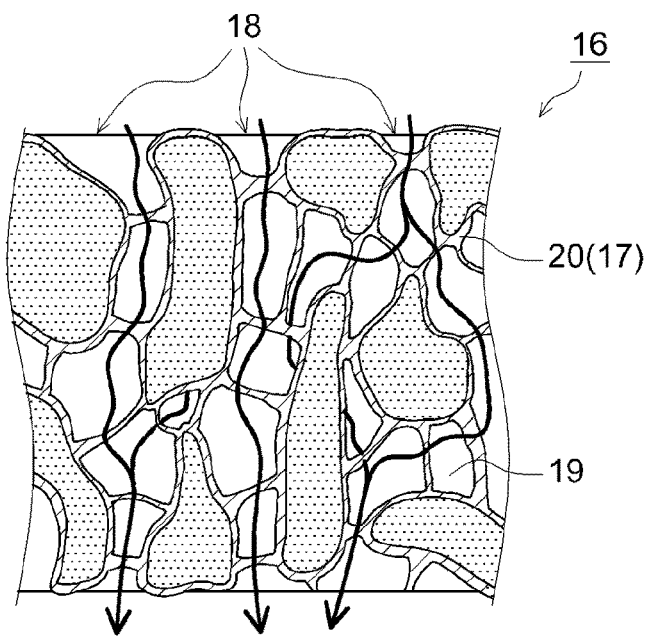
FIG. 4 is a partial cross-sectional diagram illustrating schematically an enlargement of a partition wall at which a catalyst layer is disposed.

The catalyst layer 20 includes a catalyst body 17 (FIG. 4). The catalyst body 17 is a reaction catalyst for purifying (rendering harmless) harmful components contained in the exhaust gas. Preferably, the catalyst body 17 is also a reaction catalyst for combustion and removal of PM trapped in the partition walls 16. As the catalyst body 17, known catalyst bodies that can be utilized conventionally in such fields can be used as appropriate. The catalyst body 17 in the present embodiment has an SCR function. The catalyst body 17 is for instance a zeolite (porous crystalline aluminosilicate) such as AEI, AFT, AFX, AST, BEA, BEC, CHA, EAB, ETR, GME, ITE, KFI, LEV, PAU, SAS, SAT, SAV, THO, and UFI in the notation of the framework type codes of the International Zeolite Association (IZA); a zeolite analogue typified by phosphate-based porous crystals such as silicoaluminophosphate (SAPO), and aluminophosphate (ALPO); an oxide such as alumina ($Al_2O_3$), silica ($SiO_2$), and zirconia ($ZrO_2$); or a solid solution of the foregoing oxides, for instance, a zirconia-ceria complex oxide (ZC complex oxide: $ZrO_2$—$CeO_2$).

In the present embodiment, the catalyst body 17 preferably contains at least one of a zeolite and a zeolite analogue. Preferred structures of zeolites and zeolite analogues include for instance CHA, AFX, AEI, LTA, BEA and the like. Among the foregoing, a chabazite (CHA)-type structure has a three-dimensional pore structure, with an average pore size substantially identical to the molecular size of NO and $NO_2$ (about 0.38 nm). Accordingly, the effect of the technology disclosed herein can be better elicited by using a zeolite or zeolite analogue having a CHA-type structure. Concrete examples of zeolites and zeolite analogues having a CHA-type structure include for instance SSZ-13, AlPO-34 and SAPO-34.

The zeolite or zeolite analogue may be an ion-exchanged zeolite having a transition metal ion, for instance Fe, Cu, V or the like, from the viewpoint of better enhancing $NO_x$ reducibility. Concrete examples of ion-exchanged zeolites include for instance Cu ion exchange SAPO, Fe ion-exchanged zeolite and the like. The content of Cu in the total (100 mass %) ion-exchanged zeolite is not particularly limited, but may be set for instance to 2 to 5 mass %.

An coating amount of the catalyst body 17 in the catalyst layer 20 i.e. the mass of the catalyst body 17 per L of volume of the substrate 11, is not particularly limited, but may be set for instance to about 20 to 200 g/L, typically 50 to 180 g/L and for instance 60 to 150 g/L. As a result it becomes possible to better achieve both increased $NO_x$ reducibility and curtailment of pressure loss.

The catalyst layer 20 is provided at a region of the partition walls 16 in contact with the outlet cells 14. Herein, the catalyst layer 20 is provided at least inside the partition walls 16 in contact with the outlet cells 14. For instance the catalyst layer 20 may be provided just inside the partition walls 16 that are in contact with the outlet cells 14, or may be provided at the surface and inside the partition walls 16 in contact with the outlet cells 14. As a result, PM does not reach readily a region of the partition walls 16 at which the catalyst layer 20 is provided, also when PM intrudes into the partition walls 16. It becomes accordingly possible to suppress deposition of PM on the catalyst layer 20. Exhaust gas permeability can therefore be suitably secured, and fuel consumption can be improved. Preferably, increases in pressure loss can be suitably suppressed. In the present embodiment no catalyst layer is provided at a region in contact with the inlet cells 12. It is however obvious that the catalyst layer can also be provided at a region of the partition walls 16 in contact with the inlet cells 12, instead of the catalyst layer 20 or in addition to the catalyst layer 20. For instance, the catalyst layer may be provided just inside the partition walls 16 in contact with the inlet cells 12; alternatively, a catalyst layer may be provided over the surface and throughout the interior of the partition walls 16 in contact with the inlet cells 12.

The catalyst layer 20 is disposed over a length $L_1$ along the extension direction (X direction) of the partition walls 16, from the exhaust gas outflow end section 15. Although not particularly limited thereto, $L_1$ may be about 10% or more, for instance 20% or more, preferably 30% or more, and about 100% or less, for instance 70% or less, of the total length $L_w$ of the partition walls 16. As a result it becomes possible to better achieve both increased $NO_x$ reducibility and curtailment of pressure loss. In the present embodiment, the catalyst layer 20 covers the total length of the partition walls 16 in the X direction. Specifically, the catalyst layer 20 is provided over a length identical to the total length $L_w$ of the partition walls 16. In other words, there holds $L_1=L_w$. As a result it becomes possible to suitably suppress discharge of unpurified exhaust gas out of the second exhaust gas purification catalyst 10. In the present embodiment, the second exhaust gas purification catalyst 10 has one catalyst layer 20. However, the second exhaust gas purification catalyst 10 may have, instead of the catalyst layer 20, for instance a first catalyst layer disposed along the extension direction of the partition walls 16, from the exhaust gas outflow end section 15, and a second catalyst layer disposed along the extension direction of the partition walls 16, from the exhaust gas inflow end section 13. In that case a sum total of a length $L_a$ of the first catalyst layer in the X direction and a length $L_b$ of the second catalyst layer in the X direction may be a length equal to or larger than the total length $L_w$ of the partition walls 16. In other words, there may hold $L_a+L_b \geq L_w$. As a result it becomes possible to bring out $NO_x$ reducibility and PM trapping ability more stably.

The catalyst layer 20 is disposed on the partition walls 16 over a thickness $T_1$, from the face of partition walls 16 on the side in contact with the outlet cells 14. Although not particularly limited thereto, $T_1$ may be about 20% or more, for instance 30% or more, preferably 40% or more, and may be about 100% or less, of the total thickness $T_w$ of the partition walls 16. The reducibility of $NO_x$ can be better enhanced thereby. Herein $T_1$ may be 90% or less, for instance 70% or less, of the total thickness $T_w$ of the partition walls 16. In the present embodiment, the catalyst layer 20 is provided over 70% of the total thickness $T_w$ of the partition walls 16. In other words, there holds $T_1=0.7T_w$. In a case where the second exhaust gas purification catalyst 10 has, instead of the catalyst layer 20, for instance a first catalyst layer disposed along the extension direction of the partition walls 16 from the exhaust gas outflow end section 15, and a second catalyst layer disposed along the extension direction of the partition walls 16 from the exhaust gas inflow end section 13, the thicknesses of the first catalyst layer and the second catalyst layer may be identical or dissimilar. In a preferred embodiment, a sum total of a thickness $T_a$ of the first catalyst layer and a thickness $T_b$ of the second catalyst layer is equal to or smaller than the thickness $T_w$ of the partition walls 16. In other words, there may hold $T_a+T_b \leq T_w$.

FIG. 4 is a partial cross-sectional diagram illustrating schematically an enlargement of a portion of the partition walls 16 at which the catalyst layer 20 is disposed. In the present embodiment, the pores inside the partition walls 16 are controlled by the catalyst layer 20; as a result, there is increased the contact ability between the exhaust gas and the catalyst body 17 contained in the catalyst layer 20. That is, the partition walls 16 are porous, and have in the interior thereof a plurality of internal pores 18. The catalyst layer 20 is held on wall surfaces that make up the internal pores 18 of the partition walls 16. Accordingly, the catalyst layer 20 is formed as a three-dimensional mesh, so as to mutually link opposing wall surfaces of the internal pores 18. The internal pores 18 are divided into a plurality of small pores 19 at arbitrary cross-sections of the catalyst layer 20. The small pores 19 communicate three-dimensionally in the thickness direction of the partition walls 16, and constitute exhaust gas paths. It becomes therefore possible to increase contact ability between exhaust gas and the catalyst body 17, in the catalyst layer 20. The more numerous the small pores 19, the more readily exhaust gas diffuses and flows convectively within the catalyst layer 20. As a result, it takes some time for the exhaust gas to pass through the catalyst layer 20, and reactivity between the exhaust gas and the catalyst body 17 can be increased. It becomes in consequence possible to increase suitably purification performance on harmful components, for instance $NO_x$ purification performance.

The pore volume of pores no larger than 5 μm in the catalyst layer 20 of the present embodiment, calculated on the basis of a pore distribution measured in accordance with a mercury intrusion technique, is 24000 mm³ or greater per L of volume of the substrate 11. As a result, the above effects can be brought out properly, and purification performance on exhaust gas can be effectively increased. The pore volume of pores no larger than 5 μm may be about 40000 mm³ or greater, preferably 50000 mm³ or greater, more preferably 67000 mm³ or greater and particularly 88000 mm³ or greater, per L of volume of the substrate 11, from the viewpoint of better enhancing the diffusibility and convective properties of the exhaust gas. The upper limit of the pore volume of pores no larger than 5 μm is not particularly restricted, but may be about 200000 mm³ or smaller, typically 150000 mm³ or smaller and for instance 121000 mm³ or smaller per L of volume of the substrate 11, from the viewpoint of better reducing pressure loss.

In the present specification the term "pore volume of pores no larger than 5 μm" denotes the integrated area of a region from the small pore size side up to 5 μm, in a pore distribution having pore size (μm) represented in the horizontal axis and pore volume (mm³/g) represented in the vertical axis, as measured in accordance with a mercury intrusion technique. A commercially available mercury porosimeter can be used for measurement according to the mercury intrusion technique. In the mercury intrusion technique the size of pores (pore size) and the volume of the pores (pore volume) can be measured on the basis of a relationship between the pressure applied to mercury and the amount of mercury that intrudes into voids. The mercury intrusion technique allows measuring all pores other than closed pores. In other words the pores measured in accordance with the mercury intrusion technique include also pores that are non-through pores. As a result it becomes possible to measure the diffusibility and convective properties of exhaust gas with better precision.

A permeability coefficient of the catalyst layer 20 of the present embodiment, as measured by a Perm porometer, lies in the range of 0.6 μm² to 4.4 μm². The permeability coefficient is an index denoting permeability in the passage of exhaust gas through a portion of the partition walls 16 on which the catalyst layer 20 is formed. The larger the numerical value of the permeability coefficient, the better is the permeability denoted thereby. Permeability of the catalyst layer 20 towards exhaust gas can be secured by prescribing the permeability coefficient to be equal to or larger than a predetermined value. Preferably, increases in pressure loss can be likewise curtailed. Diffusion and convection of the exhaust gas inside the catalyst layer 20 is facilitated, and slip-through of the exhaust gas can be suppressed, through setting of the permeability coefficient to be no greater than a predetermined value. The purification performance on harmful components can therefore be better enhanced.

The permeability coefficient may be about 1.0 μm² or larger, preferably 1.5 μm² or larger, for instance 1.6 μm² or larger, and particularly 1.9 μm² or larger, from the viewpoint of better suppressing increases in pressure loss. The permeability coefficient may be about 4.0 μm² or smaller, preferably 3.5 μm² or smaller, more preferably 3.0 μm² or smaller, and particularly 2.4 μm² or smaller, in terms of better suppressing exhaust gas slip-through. The purification performance on harmful components can be better enhanced when the permeability coefficient lies within the above ranges.

In the present specification, the term "permeability coefficient" denotes the permeability coefficient of Darcy for a pressure difference of 10 kPa between inlet and the outlet during flow at an air flow rate of 1 to 200 L/min, using a commercially available Perm porometer (for instance a Perm porometer by PMI (Porous Materials Inc.)). In this measurement, unlike in the above mercury intrusion technique, just the through-pores of the catalyst layer 20 can be measured. In other words, the present measurement does not factor in non-through pores. This allows therefore measuring the gas permeability of the catalyst layer 20 with good precision.

The catalyst layer 20 can be formed for instance in accordance with a wash coating method such as the one described below. Specifically, a starting slurry is prepared firstly through mixing of at least the catalyst body 17 and a pore-forming material with a solvent. For instance water, alcohol and the like can be used herein as the solvent. The starting slurry may further contain arbitrary components other than the catalyst body 17 and the pore-forming material, for instance a metal catalyst, an inorganic binder, and various additives such as viscosity adjusters. For instance a silica sol or alumina sol may be incorporated, as an inorganic binder, into the starting slurry.

Incorporating a pore-forming material into the starting slurry is important in the technology disclosed herein from the viewpoint of suitably forming a catalyst layer 20 such as the one described above, i.e. a catalyst layer 20 that is disposed, in the form of a network, in the internal pores 18 of the partition walls 16. Materials that are present stably in the starting slurry (for instance in the solvent) and disappear during firing of the catalyst layer 20 (typically during firing at 400° C. to 1000° C.) are suitable as the pore-forming material. The pore-forming material may be in powdery form. The pore-forming material may be for instance a synthetic resin such as resin beads, may be a natural polymer compound such a starch powder, or may be an inorganic material such as carbon particles. Concrete examples of synthetic resins include for instance (meth)acrylic resins, phenolic resins, epoxy resins, polyolefin resins, polyurethane resins, maleic acid resins, alkyd resins, ketone resins and the like.

The average particle size of the pore-forming material is an important parameter for establishing the size of the small pores 19 that are formed in the internal pores 18 of the partition walls 16. The average particle size (number-basis cumulative 50% particle size based on electron microscopy; likewise hereafter) of the pore-forming material may be selected for instance depending on the size of the small pores 19 that are to be formed. As an example there may be used a pore-forming material having an average particle size of about 1/40 to 3/4, for instance about 1/10 to 1/2, of the size of the small pores 19 that are to be formed. In the case for instance where a large amount of small pores 19 having a pore size of about 4 μm to 5 μm is to be formed in the internal pores 18 there may be used a pore-forming material having an average particle size of about 0.1 μm to 4 μm, typically of 0.4 μm to 2.5 μm, and for instance an average particle size of 2 μm or smaller. As another preferred example there may be used a pore-forming material having an average particle size of 0.5 μm or larger, for instance 1 μm or larger. As a result it becomes possible to better enhance at least one property from among handleability of the pore-forming material, flowability of the starting slurry, and permeability of the catalyst layer 20 towards exhaust gas.

The addition amount of the pore-forming material is an important parameter for establishing the pore volume of the small pores 19 that are formed in the internal pores 18 of the partition walls 16. The addition amount of the pore-forming material may be selected for instance depending on the porosity of the substrate 11 or the pore volume of the small pores 19 that are to be formed. The pore-forming material may be adjusted for instance to a content of 1 g to 100 g, preferably 3 g to 50 g, and more preferably 10 g to 50 g, per L of volume of the substrate 11. As a result it becomes possible to suitably combine exhaust gas permeability with purification performance on harmful components, in the catalyst layer 20. The content ratio of the pore-forming material with respect to 100 parts by mass of the catalyst body is not particularly limited, but may be adjusted to about 5 to 50 parts by mass, for instance 10 to 50 parts by mass. As a result it becomes possible to improve the flow of exhaust gas in the catalyst layer 20 and to enhance the mechanical strength of the catalyst layer 20.

To form the catalyst layer 20, next, the substrate 11 of wall flow structure is prepared, and the above starting slurry is introduced into the outlet cells 14 from the exhaust gas outflow end section 15 of the substrate 11 of wall flow structure. The starting slurry is caused to penetrate into the interior of the porous partition walls 16 by air blowing. The substrate 11 having thus been permeated by the starting slurry is then dried, and fired. The pore-forming material becomes burned off as a result, and the portions where the pore-forming material was present yield thereby the small pores 19. The catalyst layer 20 becomes formed as a result as a three-dimensional mesh in the internal pores 18 of the partition walls 16. The drying temperature is not particularly limited, and can be set typically to 80° C. to 300° C., for instance 100° C. to 250° C. The firing temperature is not particularly limited, and can be set typically to 400° C. to 1000° C., for instance 500° C. to 700° C. The catalyst layer 20 can thus be formed inside the partition walls 16 that are in contact with the outlet cells 14.

The catalyst body 17 is disposed in the form of a three-dimensional mesh in the catalyst layer 20 of the present embodiment. The catalyst layer 20 has a plurality of small pores 19 that constitute exhaust gas paths. Such a configuration results in enhanced contact ability between exhaust gas and the catalyst body 17 in the catalyst layer 20. Further, the diffusibility and convective properties of the exhaust gas is enhanced by virtue of the fact that the catalyst layer 20 has a plurality of small pores 19. Accordingly, the exhaust gas passes through the catalyst layer 20 slowly (taking some time), which allows increasing the reactivity between the exhaust gas and the catalyst body 17. It becomes as a result possible to increase suitably the purification performance on harmful components, for instance $NO_x$ purification performance.

Figure 5:
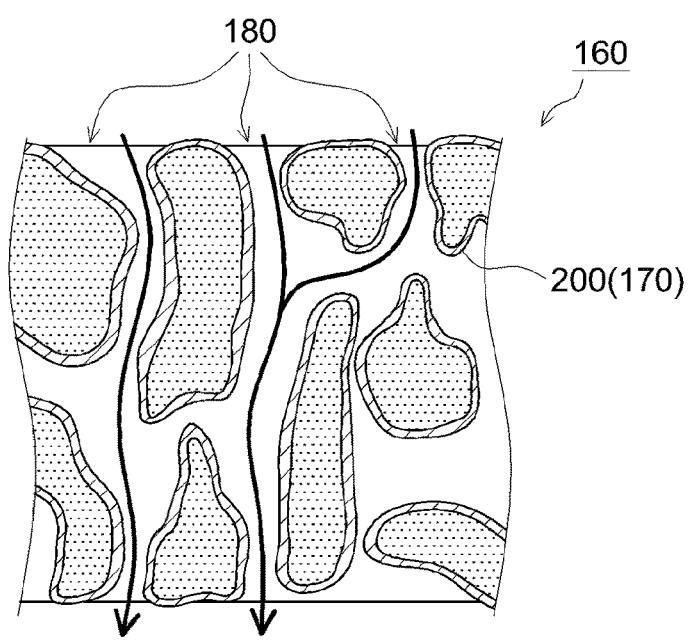
FIG. 5 is a partial cross-sectional diagram illustrating schematically the arrangement of a catalyst body according to a conventional example.

By way of contrast, FIG. 5 is a partial cross-sectional diagram illustrating schematically an enlargement of a portion of partition walls 160 at which a catalyst layer 200 is disposed. In FIG. 5, the catalyst body 170 is densely coated onto the wall surface that makes up internal pores 180 of the partition walls 160. Unlike in the technology disclosed herein, the internal pores 180 are not divided into a plurality of small pores. This results in a structure in which exhaust gas slips readily through the catalyst layer 200 in a short time. In other words, the diffusibility and convective properties of the exhaust gas in the catalyst layer 200 are insufficient. It is therefore deemed that the catalyst body 170 is not effectively utilized in the conventional catalyst layer 200, and purification performance on harmful components, for instance $NO_x$ purification performance, is low.

The exhaust gas purification device 1 of FIG. 1 is provided with the reducing agent supply mechanism 5, and the second exhaust gas purification catalyst 10 is a SCR catalyst. However, the exhaust gas purification device 1 is not limited thereto. Specifically, the essence of the technology disclosed herein, is to contrive exhaust gas paths by controlling the internal pores 18 of the partition walls 16 through formation of the catalyst layer 20, as described above. Therefore, the second exhaust gas purification catalyst 10 is not limited to the SCR catalyst illustrated in the above embodiment, and can be widely used in various types of exhaust gas purification catalyst. In other words, the second exhaust gas purification catalyst 10 need not have a SCR function. The second exhaust gas purification catalyst 10 may be for instance a diesel oxidation catalyst (DOC), a $NO_x$ adsorption reduction catalyst (NSR) or a three-way catalyst, exemplified as the first exhaust gas purification catalyst 9. The second exhaust gas purification catalyst 10 may be provided with for instance a carrier and a metal catalyst supported on the carrier. The exhaust gas purification device 1 need not have the reducing agent supply mechanism 5 in a case where the second exhaust gas purification catalyst 10 does not have an SCR function.

Test examples pertaining to the technology disclosed herein will be explained next, but the technology disclosed herein is not meant to be limited to the test examples illustrated below.

Example 1

Firstly CHA-type aluminosilicate containing silica and alumina were dispersed in deionized water as a solvent. Then copper acetate was added to the dispersion, and the whole was heated up to 80° C. This was followed by stirring for 12 hours at 80° C., with subsequent filtration of the solids, and washing. The obtained solid product was dried at 200° C. for 5 hours, to produce Cu ion-exchanged zeolite (Cu supported amount 3 wt %). Next, the produced Cu ion-exchanged zeolite (1000 g), silica sol (300 g) and pure water (1000 g) were mixed, and the resulting mixture was stirred for 1 hour in a ball mill, to thereby prepare a precursor slurry. Then 50 g (5 g per L of substrate) of a pore-forming material (resin material having an average particle size of 1 μm) were added thereto, with further stirring in a ball mill, to prepare a starting slurry.

Next there was prepared a substrate of wall flow structure (made of cordierite, having a cylindrical shape, diameter 160 mm, total length of partition wall of 150 mm, partition wall thickness of 12 mils, porosity 65%). Next the prepared starting slurry was introduced into the outlet cells from the exhaust gas outflow end section, and a wash coat layer was formed inside the partition walls of the substrate, through air blowing. The coating amount (mass of Cu ion-exchanged zeolite as solids) of the wash coat layer was set to 100 g per L of volume of the substrate. The flow rate and duration of air blowing were controlled in such a manner that in the wash coat layer the starting slurry penetrated over a length identical to the total length of the partition wall in the X direction, from the exhaust gas outflow end section, and over a thickness of 70% from the surface of the partition walls in contact with the outlet cells. The substrate having been permeated by the starting slurry was dried at 100° C. for 60 minutes, followed by a thermal treatment at 500° C. for 30 minutes, to thereby form a catalyst layer inside the partition walls in contact with the inlet cells. An exhaust gas purification catalyst was obtained as a result.

Examples 2 to 6

In Example 2 an exhaust gas purification catalyst was obtained in the same way as in Example 1, but setting herein to 100 g (10 g per L of substrate) the amount of pore-forming material that was added to the precursor slurry. In Example 3 an exhaust gas purification catalyst was obtained in the same way as in Example 1, but setting herein to 500 g (50 g per L of substrate) the amount of pore-forming material that was added to the precursor slurry. In Example 4 an exhaust gas purification catalyst was obtained in the same way as in Example 1, but herein the substrate was modified to a substrate having a porosity of 61% and a partition wall thickness of 11 mils, and the coating amount of the wash coat layer was set to 110 g per L of volume of the substrate. In Example 5 an exhaust gas purification catalyst was obtained in the same way as in Example 3, but herein the substrate was modified to a substrate having a porosity of 70% and a partition wall thickness of 13 mils, and the coating amount of the wash coat layer was set to 60 g per L of volume of the substrate. In Example 6 an exhaust gas purification catalyst was obtained in the same way as in Example 5, but setting herein to 50 g (3 g per L of substrate) the amount of pore-forming material that was added to the precursor slurry.

Comparative Examples 1 to 4

In Comparative Example 1 an exhaust gas purification catalyst was obtained in the same way as in Example 1, but herein no pore-forming material was added to the precursor slurry, which was used, as it was, as the starting slurry. In Comparative Example 2 an exhaust gas purification catalyst was obtained in the same way as in Example 3 but herein the substrate was modified to a substrate having a porosity of 75% and the coating amount of the wash coat layer was set to 60 g per L of volume of the substrate. In Comparative Example 3 an exhaust gas purification catalyst was obtained in the same way as in Example 2, but herein the coating amount of the wash coat layer was set to 40 g per L of volume of the substrate. In Comparative Example 4 an exhaust gas purification catalyst was obtained in the same way as in Example 2, but herein the pore-forming material was modified to a material having an average particle size of 5 µm.

Evaluation of Pore Distribution Using a Mercury Porosimeter. Firstly, the partition wall portion having the catalyst layer formed thereon was cut out in each exhaust gas purification catalyst produced above. In each example there was collected a sample about 10 mm square and centered at a position of the partition wall removed by 20 mm, along the extension direction of the partition wall, from the exhaust gas outflow end section of the exhaust gas purification catalyst. Next a measurement was carried out over a pressure range of 0.01 MPa to 200 MPa in accordance with a mercury intrusion technique, to thereby evaluate pore size in the range of 110 µm to 0.007 µm. Next a pore distribution was created with pore diameter (µm) represented in the horizontal axis and pore volume (mm$^3$/g) represented in the vertical axis. The integrated area of a region from the small pore diameter size up to 5 µm was calculated as the pore volume of pores no larger than 5 µm, and the result was normalized per L of volume of the substrate. The results are given in Table 1 in the column "pore volume of pores no larger than 5 µm per unit volume of substrate".

Evaluation of Gas Permeability Coefficient Using a Perm Porometer. Firstly, the above collected samples were plugged so as to enable passage of air only through portions to be evaluated. Next, each sample was set on the holder of a Perm porometer produced by PMI, air was caused to flow through the sample at 1 to 200 L/min while gas pressure was modified, and the flow rate of air under pressure was measured. A permeability coefficient for a pressure difference of 10 kPa between inlet and outlet during flow of air was worked out on the basis of the following expression: K=QVT/AM (where K=permeability coefficient (units: µm$^2$), Q=flow rate (units: µm$^3$/s) of air under pressure, V=viscosity (units: Pa·s) of air, T=sample thickness (units: µm), A=cross-sectional area (units: µµm$^2$) of the sample, and M=gas pressure (units: Pa) during flow of air). The results are given in Table 1 in the column "Permeability coefficient".

Evaluation of NO$_x$ Purification Rate. Firstly, each exhaust gas purification catalyst produced above was subjected beforehand to hydrothermal aging at 750° C. for 40 hours. An exhaust gas purification system such as the one illustrated in FIG. 1 was constructed using an engine bench. Specifically, a 2.2 L common-rail diesel engine was used as the internal combustion engine. The exhaust pipe of the diesel engine was fitted with a DOC catalyst as a first exhaust gas purification catalyst, and with the above exhaust gas purification catalyst after hydrothermal aging, as a second exhaust gas purification catalyst, in this order. Commercially available aqueous urea (AdBlue (trademark)) was used as the reducing agent. The aqueous urea was added to the exhaust gas using an injector, upstream of the second exhaust gas purification catalyst. The addition amount of the aqueous urea was adjusted so that the equivalent ratio of ammonia and NO$_x$ at the time where aqueous urea yielded ammonia (NH$_3$), as a result of the action of the SCR catalyst, was 1. Next, the NO$_x$ purification rate for an intake air amount of 30 g/s was measured under a steady-state condition where the temperature of the exhaust gas purification catalyst was 250° C. Herein a NO$_x$ purification rate was calculated according to the expression below, on the basis of the NO$_x$ concentration on the inlet side of the exhaust gas purification catalyst (NO$_x$ concentration of gas into catalyst) and the NO$_x$ concentration on the outlet side of the exhaust gas purification catalyst (NO$_x$ concentration of gas from catalyst). The results are given in Table 1 in the column "NO$_x$ purification rate".

$$NO_x \text{ purification rate } (\%) = \frac{NOx \text{ concentration (ppm) of gas into catalyst} - NO_x \text{ concentration (ppm) of gas from catalyst}}{NOx \text{ concentration (ppm) of gas into catalyst}} \times 100 \quad \text{[Math. 1]}$$

TABLE 1

| | Substrate | | Pore-forming material (resin) | | Coating | Pore volume of the pores no larger than | | | |
|---|---|---|---|---|---|---|---|---|---|
| | Porosity (%) | Partition wall thickness (mils) | Addition amount (g/L - substrate) | Average particle size (μm) | amount (g/L - substrate) | 5 μm per unit volume of substrate (mm$^3$/L - substrate) | Permeability coefficient (μm$^2$) | NO$_x$ purification rate @ 250° C. (%) | Evaluation |
| Example 1 | 65 | 12 | 5 | 1 | 100 | 83000 | 1.6 | 89 | good |
| Example 2 | 65 | 12 | 10 | 1 | 100 | 88000 | 1.9 | 93 | excellent |
| Example 3 | 65 | 12 | 50 | 1 | 100 | 121000 | 2.4 | 93 | excellent |
| Example 4 | 61 | 11 | 5.5 | 1 | 110 | 102000 | 0.6 | 88 | good |
| Example 5 | 70 | 13 | 30 | 1 | 60 | 67000 | 4.4 | 90 | excellent |
| Example 6 | 70 | 13 | 3 | 1 | 60 | 24000 | 3.6 | 86 | good |
| Comparative Example 1 | 65 | 12 | — | — | 100 | 72000 | 0.4 | 84 | poor |
| Comparative Example 2 | 75 | 12 | 30 | 1 | 60 | 44000 | 5.0 | 84 | poor |
| Comparative Example 3 | 65 | 12 | 4 | 1 | 40 | 15000 | 4.4 | 80 | poor |
| Comparative Example 4 | 65 | 12 | 10 | 5 | 100 | 80000 | 0.4 | 82 | poor |

In the evaluation, instances of NO$_x$ purification rate of 90% or higher are rated as excellent, those of NO$_x$ purification rate of 85% or higher are rated as good, and those of NO$_x$ purification rate lower than 85% are rated as poor.

As Table 1 reveals, the NO$_x$ purification rate was lowest in Comparative Example 3, where the pore volume of the pores no larger than 5 μm was relatively small. The underlying reason for this can be ostensibly ascribed to the relatively low diffusibility of gas into the catalyst layer, and insufficient reaction between the catalyst body and exhaust gas. In Comparative Example 1, where no pore-forming material was used during formation of the catalyst layer, and in Comparative Example 4, where a pore-forming material having a large average particle size was used, the permeability coefficient of the catalyst layer was relatively small, and the NO$_x$ purification rate was likewise relatively low. The underlying reason for this can be ostensibly ascribed to the insufficient reaction between the catalyst body and the exhaust gas, similarly to Comparative Example 3. The NO$_x$ purification rate was low also in Comparative Example 2, where the permeability coefficient of the catalyst layer was relatively large. The underlying reason for this can be ostensibly ascribed to the fact that exhaust gas passed quickly through the catalyst layer and thus the reaction between the catalyst body and the exhaust gas was insufficient, due to the excessive amount of through-pores.

The NO$_x$ purification rates in Examples 1 to 6 were relatively higher than those in the comparative examples. The underlying reason for this can be ostensibly ascribed to the fact that the contact ability between the catalyst body and exhaust gas is improved by satisfying both the following conditions: (1) the pore volume of pores no larger than 5 μm is 24000 mm$^3$ or greater (for instance 24000 mm$^3$ to 121000 mm$^3$) per unit volume of the substrate; and (2) the permeability coefficient is 0.6 μm$^2$ to 4.4 μm$^2$, and the fact that exhaust gas diffuses readily within the catalyst layer, and the reactivity between the catalyst body and the exhaust gas is enhanced.

Among the examples, the NO$_x$ purification rate was excellent, at 88% or higher, when the pore volume of pores no larger than 5 μm was 67000 mm$^3$ or greater per unit volume of the substrate. The NO$_x$ purification rate was particularly good, at 90% or higher, when the permeability coefficient was 1.9 μm$^2$ or larger. Further, the NO$_x$ purification rate was significantly good, at 93% or higher, when the permeability coefficient was 2.4 μm$^2$ or smaller.

Concrete examples of the technology disclosed herein have been explained above in detail, but the concrete examples are illustrative in nature and are not meant to limit the scope of the claims in any way. The technology set forth in the claims includes variations and modifications of the concrete examples illustrated above.

The terms and expressions used herein are for description only and are not to be interpreted in a limited sense. These terms and expressions should be recognized as not excluding any equivalents to the elements shown and described herein and as allowing any modification encompassed in the scope of the claims. The preferred embodiments disclosed herein may be embodied in many various forms. This disclosure should be regarded as providing preferred embodiments of the principle of the invention. These preferred embodiments are provided with the understanding that they are not intended to limit the invention to the preferred embodiments described in the specification and/or shown in the drawings. The invention is not limited to the preferred embodiment described herein. The invention disclosed herein encompasses any of preferred embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described in this specification or used during the prosecution of the present application.

What is claimed is:

1. An exhaust gas purification catalyst disposed in an exhaust path of an internal combustion engine and configured to purify exhaust gas emitted by the internal combustion engine, the exhaust gas purification catalyst comprising:
    a substrate of wall flow structure where an inlet cell in which an exhaust gas inflow end section is open and an exhaust gas outflow end section is closed, and an outlet cell in which an exhaust gas outflow end section is open and an exhaust gas inflow end section is closed, are partitioned by a porous partition wall; and
    a catalyst layer disposed at least inside the partition wall and including a catalyst body, wherein the catalyst layer satisfies the following conditions:
(1) in a relationship between a pore size and a pore volume based on a pore distribution measured in accordance with a mercury intrusion technique, the pore volume of pores no larger than 5 μm is 24000 mm$^3$ or greater per L of volume of the substrate; and
(2) a permeability coefficient measured by a Perm porometer is 0.6 μm$^2$ to 4.4 μm$^2$.

2. The exhaust gas purification catalyst according to claim 1, wherein the permeability coefficient is 1.9 μm$^2$ or larger.

3. The exhaust gas purification catalyst according to claim 2, wherein the permeability coefficient is 2.4 μm$^2$ or smaller.

4. The exhaust gas purification catalyst according to claim 1, wherein the pore volume of the pores no larger than 5 μm is 67000 mm$^3$ or greater per L of volume of the substrate.

5. The exhaust gas purification catalyst according to claim 4, wherein the pore volume of the pores no larger than 5 μm is 121000 mm$^3$ or smaller per L of volume of the substrate.

6. The exhaust gas purification catalyst according to claim 1, wherein the catalyst layer is disposed so as to be in contact with the outlet cell.

7. The exhaust gas purification catalyst according to claim 1, wherein the catalyst layer covers a total length of the partition wall in an extension direction of the partition wall.

8. The exhaust gas purification catalyst according to claim 1, wherein the catalyst body contains at least one of a zeolite, silicoaluminophosphate, aluminophosphate and an ion-exchanged zeolite.

9. An exhaust gas purification device, comprising:
an internal combustion engine;
an exhaust path for exhaust gas, the exhaust path having one end connected to the internal combustion engine;
the exhaust gas purification catalyst according to claim 1, disposed in the exhaust path for exhaust gas; and
a reducing agent supply mechanism that supplies a reducing agent to the exhaust gas in the exhaust path for exhaust gas and upstream of the exhaust gas purification catalyst in the flow direction of exhaust gas.

10. The exhaust gas purification device according to claim 9, wherein the internal combustion engine is a diesel engine.

* * * * *